United States Patent [19]

Bischof et al.

[11] Patent Number: 5,032,034
[45] Date of Patent: Jul. 16, 1991

[54] SUPPORT AND POSITIONING DEVICE FOR AXLES OF OFFICE MACHINES SUCH AS PRINTERS

[75] Inventors: Stefan Bischof, Ulm-Jungingen; Erich Steppe, Ulm, both of Fed. Rep. of Germany

[73] Assignee: Mannesmann Aktiengesellschaft, Düsseldorf, Fed. Rep. of Germany

[21] Appl. No.: 242,440

[22] Filed: Sep. 9, 1988

[30] Foreign Application Priority Data

Sep. 9, 1987 [EP] European Pat. Off. ........ 87730105.1

[51] Int. Cl.[5] ............................................. B41J 11/04
[52] U.S. Cl. ..................................... 400/660; 400/692; 400/660.1
[58] Field of Search ................. 400/354, 354.2, 354.3, 400/275, 264, 265, 266, 352, 354, 354.3, 660, 660.1, 660.2, 55-59, 656, 692; 403/154, 155, 330; 101/348; 411/337, 352; 29/227, 267; 24/455

[56] References Cited

U.S. PATENT DOCUMENTS

| 3,347,159 | 10/1967 | Altonji et al. ............... 400/660.2 |
| 3,857,644 | 12/1974 | Mikani ............................. 403/196 |
| 4,452,542 | 6/1984 | Akazawa ....................... 400/354 |
| 4,493,566 | 1/1985 | McMahon et al. ........ 400/354.3 X |
| 4,519,723 | 5/1985 | Kusmierz ......................... 403/330 |
| 4,787,759 | 11/1988 | Geis et al. .................. 400/354.3 X |
| 4,795,284 | 1/1989 | Yumoto et al. ............... 400/352 |
| 4,854,233 | 8/1989 | Despot et al. ................. 400/330 |
| 4,865,476 | 9/1989 | Kondo et al. .................. 400/352 |

FOREIGN PATENT DOCUMENTS 2512274 5/1978 Fed. Rep. of Germany.
89633 3/1983 Fed. Rep. of Germany.

| 149381 | 4/1986 | Japan ............................ 400/354 |
| 235174 | 10/1986 | Japan ........................ 400/354.3 |
| 119076 | 5/1987 | Japan ........................ 400/354.3 |

OTHER PUBLICATIONS

IBM Tech. Disc. Bulletin, "Automated Assembly Clip", vol. 27, No. 12, May 1985, pp. 6820–6821.
IBM Technical Disclosure Bulletin, "Slotted Bearing", vol. 27, No. 10B, Mar. 1985, pp. 6237–6238.

*Primary Examiner*—Edgar S. Burr
*Assistant Examiner*—Joseph R. Keating
*Attorney, Agent, or Firm*—Horst M. Kasper

[57] ABSTRACT

A securing device for axles (2) in office machines, in particular in printers, with axle journals (2c), which axle journals (2c) are furnished with insertion grooves (2d) near their ends and which axles (2) are supported in side plane components (1) against an axial shifting by way of spring elements. An economic and assembly-friendly securing device is provided by having the axle (2), forming a shoulder (2b), and resting on the inside of the side plane component (1), where the axle journal (2c) can be inserted into an about elongatedly shaped opening (4) in the side plane component (1) following to the insertion groove (2d), such that the axle journal diameter (9) of the axle journal (2c) rests in a smaller circular opening (5) of the elongatedly shaped opening (4), where a spring-loaded tension element (10) can be positioned and inserted between the side plane component (1) and the axle journal (2c) into the insertion groove (2d) passing over the axle journal diameter (9) at the side plane component (1) and where the spring-loaded tension element (10) can be tensioned in the insertion groove (2d) under spring tension crosswise to the axle journal (2c).

24 Claims, 2 Drawing Sheets

SUPPORT AND POSITIONING DEVICE FOR AXLES OF OFFICE MACHINES SUCH AS PRINTERS

BACKGROUND OF THE INVENTION

1. Field of the Invention

The invention relates to a securing device for axles in office machines, in particular in printers, with axle journals furnished with insertion grooves, where the journals are secured and supported in side plane components against an axial shifting by way of a spring element.

2. Brief Description of the Background of the Invention Including Prior Art

Such supports are employed as metal or plastic bushings in axle direction in wall plates, side walls, and the like, of printers, such as, for example, of matrix printers, and they are locked by special means. The locking mechanisms are associated with the disadvantage that they can be unlocked by accelerating forces, which are generated during transport of the office machine or by shocks during the transport of the office machine.

Conventional axle supports, in addition, are uneconomical in production and in assembly. In general, several steps are required for the assembly process, where the assembly has to be performed exclusively by hand.

The economic development, the price pressures and competition require now that producers of electric office machines take into consideration the simplifying of such supports and, in fact, both with respect to the production technique as well as to the assembly procedure.

SUMMARY OF THE INVENTION

1. Purposes of the Invention

It is an object of the present invention to furnish a securing device for axles in office machines, which can be economically produced and which can be easily assembled, which securing device supports the axle journal simultaneously in axial and radial directions, and free from play.

It is another object of the present invention to provide a securing device for axle journals in office machines where expensive precision fittings at the axle or, respectively, at the support of the axle can be avoided.

It is yet a further object of the present invention to provide a support for a platen of an office machine, where a single element provides both the retaining and the spring function.

These and other objects and advantages of the present invention will become evident from the description which follows.

2. Brief Description of the Invention

According to the invention an axle forms a collar resting at the side plane component on the inside. An axle journal, adjoining to the insertion groove, can be inserted into an about elongated shaped opening in the side plane component, such that the axle journal diameter of the axle journal rests in a smaller circular opening of the elongatedly shaped opening. A spring-loaded tension element can be inserted on the outside at the side plane component between the side plane component and the axle journal into the insertion groove above the axle journal diameter. The spring-loaded tension element can be tensioned in the insertion groove under spring force crosswise to the axle journal. This means, in relation to production technique, that a correspondingly shaped opening has to be provided only in the side plane component and that only the spring-loaded tension element has to be produced. The assembly of the axle, provided anyway with insertion grooves, is very simple and can be quickly performed and assures a high degree of security against a disengagement of the securing and locking element. The securing device, however, is free from play, both in an axial as well as in a radial direction. Nevertheless, it is possible to rotate the axle by hand into a desired circumferential position.

An axle having two ends is formed with a collar at each end and furnished with an insertion groove at each end. Two side plane components each having an elongated shaped opening including a small circular opening are disposed about in parallel. The axle journal adjoining the insertion groove can be inserted into an elongated opening in the side plane component such that the axle journal diameter of the axle journal rests in the small circular opening of the elongated shaped opening. The axle rests from the inside at the collar against the respective side plane component. A spring-loaded tensioning element is inserted between each side plane component and the axle journal in the respective insertion groove over the axle journal diameter at each side plane component. The spring-loaded tensioning element can be tensioned in the insertion groove under spring tension crosswise to the axle journal. The axle journal is securedly positioned in said side plane components against axial shifting by way of the respective spring-loaded tensioning element. The spring-loaded tensioning element can be formed of an eyelet part and of an arched center part following to the eyelet part and of a hook-shaped extension following in a longitudinal direction to an arched center part of the spring-loaded tensioning element.

A shaped opening can be disposed in the side plane component substantially opposite of the about elongated opening in a longitudinal direction. An inner limitation of the shaped opening can be formed by a curve course rising around the center point of the smaller circular opening of the elongated side plane component opening. The hook-shaped extension of the spring-loaded tension element can rest at the inner limitation of the curve course of the shaped opening or, respectively, locks at the end of the rise of the inner curve course in a small recess of the shaped opening.

An opening can be disposed in a respective side plane and directed radially to the center point of the smaller circular opening of the side plane component opening. Said radially directed opening can have a width which is larger than the width of the hook-shaped extension of the spring-loaded tensioning element. The radially directed opening adjoins the shaped opening of the side plane component furnished with the curve course.

A slot for insertion is preferably disposed in a respective spring-loaded tensioning element and directed about parallel to the elongation direction of the spring-loaded tensioning element for allowing insertion and/or removal of the spring-loaded tensioning element from the axle journal and the side wall. The spring-loaded tensioning element is preferably made of sheet metal and includes a first section having an opening about centrally located and substantially circular and furnishing a retaining edge for the respective circular insertion groove. A bending line at one end of the first section is disposed in an approximately tangential position relative to the circle of the centrally located, substantially circular opening. The spring-loaded tensioning element includes a second section, where a semicircular opening follows to the centrally located, substantially circular opening such that the first bending line is about a diameter through the radial center of the semicircular opening and the radius of the semicircular opening is sufficient to allow passage of the axle journal. The semicircular opening and the centrally located, substantially circular opening are joined opening such that the sheet metal piece with the semicircular opening can slip over the axle journal and the centrally located, substantially circular opening can be placed around the insertion groove. Said second section is bent about cylindrically, where the cylinder axis is disposed about parallel to the first bending line. The spring loaded tensing element is narrowing in a direction perpendicular to the first bending line to less than half of the maximum width of the first section in a direction parallel to the first bending line. A third section joins the second section along a second bending line substantially parallel to the first bending line and furnished with a third bending line of the third section disposed about parallel to the second bending line. An extension section joins the third section at the third bending line and forms a hook. The angle between the first section and the second section at the first bending line is preferably from about 150 to 170 degrees. The angle between the second section and the third section at the second bending line is preferably from about 150 to 170 degrees. The distance between the first bending line and the second bending line is preferably from about 1 to 1.2 times the maximum dimension of the first section in a direction parallel to the first bending line.

The extension section can comprise a fourth section bent relative to the third section at an angle of from about 70 to 100 degrees around the third bending line. The fourth section extends to a fourth bending line running approximately parallel to the third bending line. A fifth section adjoins the fourth section at the fourth bending line at an angle of from about 70 to 100 degrees such that a projection of the fifth section in a direction perpendicular to the third section onto the third section substantially overlaps the third section.

The angle between the first section and the second section at the first bending line is preferably from about 150 to 170 degrees. The angle between the second section and the third section at the second bending line is preferably from about 150 to 170 degrees. Said angle at the second bending line is on an opposite side of the third section as compared with said angle at the third bending line. Said angle at the first bending line is on the same side relative to the second section as said angle at the second bending line. A slot can be disposed in the third section providing a force engagement location for a tool means to disengage the spring-loaded tensioning element from a side wall of an office machine.

Two side plane components are disposed about in parallel, where each side plane component is furnished with an elongated shaped opening including a smaller circular opening. An axle journal, having two ends and formed with a collar at each end and furnished with an insertion groove at each end, can be inserted into the respective elongated shaped opening of the respective side plane component. Thereby the axle journal diameter of the axle journal rests in the smaller circular opening of the elongated shaped opening. The axle rests from the inside at the collar against the respective side plane component. A spring-loaded tensioning element is inserted between each side plane component and the axle journal in the respective insertion groove over the axle journal diameter at each side plane component. The spring-loaded tensioning element is furnished in the insertion groove under spring tension crosswise to the axle journal. Said axle journal is positioned securely in said side plane components against axial shifting by way of the respective spring-loaded tensioning element. The spring-loaded tensioning element can be formed as an eyelet part with an arched center part following to the eyelet part. A hook-shaped extension can be bent to follow in a longitudinal direction to an arched center part of the spring-loaded tensioning element.

A shaped opening can be disposed in the side plane component substantially opposite of the about elongated opening in a longitudinal direction. An inner limitation of the shaped opening can be formed by a curve course rising around the center point of the smaller circular opening of the elongated side plane component opening. The hook-shaped extension of the spring-loaded tension element can rest at the inner limitation of the curve course of the shaped opening or, respectively, lock at the end of the rise of the inner curve course in a small recess of the shaped opening.

An opening can be disposed in a respective side plane and directed radially to the center point of the smaller circular opening of the side plane component opening. Said radially directed opening can have a width which is larger than the width of the hook-shaped extension of the spring-loaded tension element. The radially directed opening adjoins the shaped opening of the side plane component furnished with the curve course. A slot can be disposed in a respective spring-loaded tensioning element and directed about parallel to the elongation direction of the spring-loaded tensioning element for allowing insertion and/or removal of the spring-loaded tensioning element from the journal axle and the side wall.

According to a further feature of the invention, it is provided that the spring-loaded tensioning element is formed of an arched center part following to the eyelet part and a hook-shaped extension following in longitudinal direction. The spring-loaded tensioning element therefore comprises a punch bending part producible in large quantities.

Another improvement of the invention comprises that a shaped opening is disposed in the side plane component of the about longitudinal opening in longitudinal direction disposed substantially opposite. The inner limitation of the shaped opening is formed by a rising curve course around the center point of the smaller circular opening of the elongated side plane component opening. The hook-shaped extension of the spring-loaded tensioning element rests at the inner limitation or, respectively, at the end of the curve. These steps assure the generation of a pull tensioning for the spring-loaded tension element and at the same time a securing against disengagement of the tension element.

It is further disclosed that the formed opening, exhibiting the curve course of the side plane component, is being followed by an opening, directed radially to the center point of the smaller circular opening of the side plane component opening, with a width, where the width is larger than the width of the hook-shaped extension of the spring-loaded tension element. The opening makes the assembly and the application of the pull tension easier and thus furnishes an improvement of the locking mechanism.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
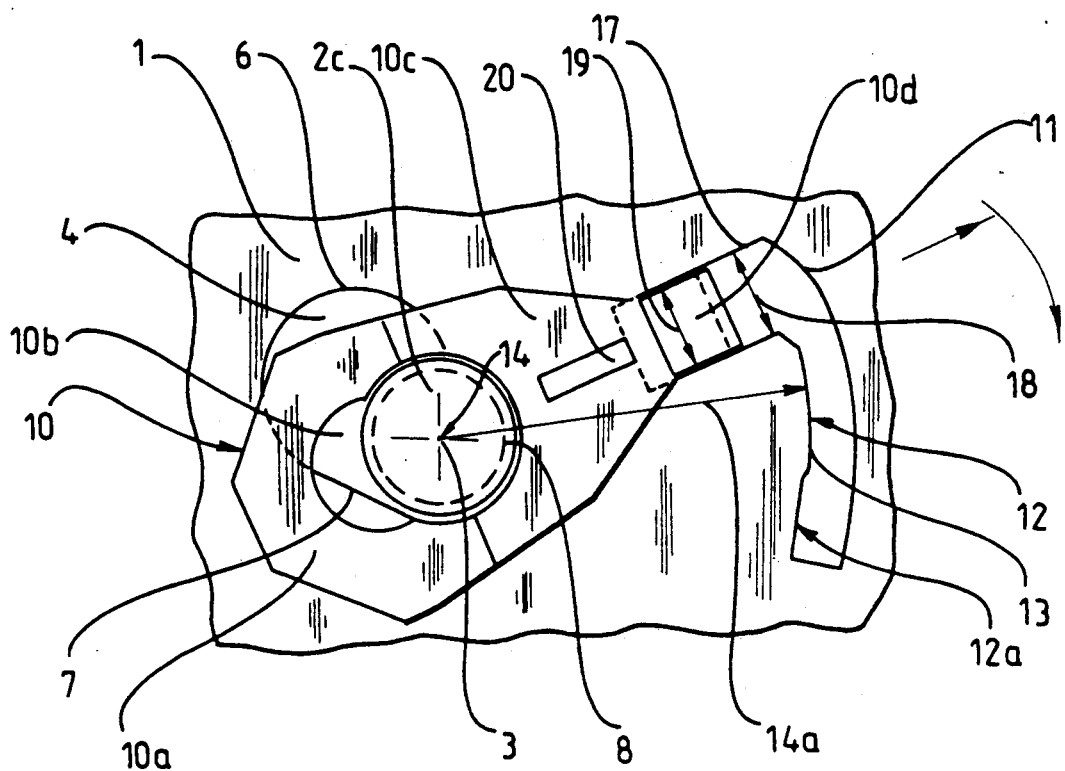
FIG. 1 is a top plan view onto a side plane component with the spring-loaded tensioning element during the insertion step.

According to the invention, there is provided an attachment device for axles 2 in office machines, such as printers. The axles 2 include axle journals 2c exhibiting the insertion grooves 2d. The axle journal is securely positioned in side plane components 1 against axial shifting by way of springing elements. The axle 2 is formed with a collar 2b resting from the inside against the side plane component 1. The axle journal 2c, adjoining the insertion groove 2d, can be inserted into an elongated opening 4 in the side plane component 1, such that the axle journal diameter 9 of the axle journal 2c rests in a smaller circular opening 5 of the elongated shaped opening 4.

A spring-loaded tensioning element 10 can be inserted between the side plane component 1 and the axle journal 2c in the insertion groove 2d over the axle journal diameter 9 at the side plane component 1. The spring-loaded tensioning element 10 can be tensioned in the insertion groove 2d under spring tension crosswise to the axle journal 2c. The spring-loaded tensioning element 10 is preferably formed from an eyelet part 10a and from an arched center part 10c following to the eyelet part 10a and a hook-shaped extension 10d following in a longitudinal direction to the arched center part 10c.

A shaped opening 11 can be disposed in the side plane component 1 substantially opposite of the about elongated opening 4 in a longitudinal direction. The inner limitation 12 of the shaped opening 11 is formed by a curve course 13 rising around the center point 14 of the smaller circular opening 5 of the elongated side plane component opening 4. The hook-shaped extension 10d of the spring-loaded tensioning element 10 rests at the inner limitation 12 or, respectively, locks at the end of the curve 13. An opening 17 with a width 18 is connected to the shaped opening 11 of the side plane component 1 furnished with the curve course 13. This opening 17 is directed radially to the center point 14 of the smaller circular opening 5 of the side plane component opening 4. The width 18 is larger than the width of the hook-shaped extension 10d of the spring-loaded tensioning element 10.

The embodiment illustrated in FIG. 1 is a matrix printer. The side plane component 1 comprises one of the side platens of a matrix printer frame. A carriage guide axle 2a is selected as axle 2. Two such carriage guide axles 2a provide the guide for the carriage supporting the print head of a matrix printer.

A collar 2b of the axle 2 rests at the inner side 1a of the side plane component 1. The axle 2 comprises an axle journal 2c with an insertion groove 2d.

The side plane component 1 comprises in the axial position 3, illustrated in FIG. 1, an about elongated shaped opening 4 with a smaller opening 5 and a larger circular opening 6, which form both together an about elongatedly shaped opening 4, formed by tangent-shaped limitations 7. The axle journal diameter 9 of the axle journal 2c corresponds to the smaller circular opening 5 of the side plane. The diameter 9 of the platen axle 2 can, in this case, be passed freely through the larger circular opening 6 and thus axle 2 can be placed against the smaller circular opening 5. The diameter of the opening 6 can be from about 1.002 to 1.02 times the diameter of the diameter of the axle journals. The diameter 8 determines the insertion groove 2d.

Accordingly, a spring-loaded tensioning element 10 is inserted into the insertion groove 2d past the axle journal diameter 9 between an outer side 1b of the side plane component 1 and the axle journal 2c. The spring-loaded tensioning element 10 is tensioned and locked in the insertion groove 2d crosswise to the axle journal 2c, as will be described in more detail below.

The spring-loaded tensioning element 10 comprises an eyelet part 10a with a eyelet 10b, an arched center part 10c following to the eyelet part 10a, and a hook-shaped extension 10d following in longitudinal direction of the tensioning element.

The spring-loaded tensioning element 10 is formed by five sections. The first section, formed by the eyelet part 10a, is defined by the top part of the spring-loaded tensioning element and the bending line 53. The second section, formed by the arched center part 10c, is defined by the bending lines 53 and 52. The third, fourth, and fifth sections are formed by the hook-shaped extension 10d, where the third section is defined by the bending lines 52 and 51, the fourth section is defined by the bending lines 51 and 50, and the fifth section is defined by the bending line 50 and the upwardly bent part of the hook-shaped extension 10d.

The formed opening 11 is disposed in the side plane component 1 opposite to the about elongated opening 4. The inner limitation 12 of the formed opening 11 is provided by a rising curve course 13. The rising curve course line 13 is defined relative to a circular bow section, which can be drawn around a center point 14 with a radius 14a. The center point 14 is at the same time the center point of the smaller circular opening 5, which determines the position of the axle 2 and which coincides, depending on tolerances, with the axle journal diameter 9 of the axle journal 2c.

Figure 2:
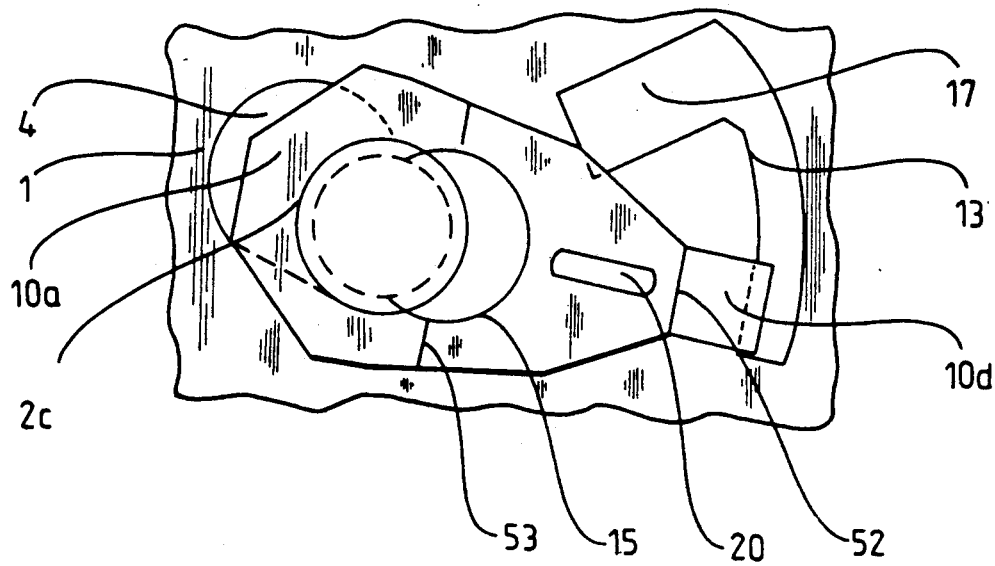
FIG. 2 is a top plan view similar to that of FIG. 1, with the spring-loaded tensioning element disposed after the insertion process in the locking position.

The eyelet part 10a is provided with a keyhole-shape eyelet 10b. The larger keyhole opening 15, illustrated in FIG. 2, forms a free passage for the axle journal diameter 9. The spring action of the spring-loaded tensioning element 10 is enhanced and increased in addition to the arched center part 10c also by a bending angle 16, versus a plane perpendicular to the axle journal through the groove diameter 8 as illustrated in FIG. 3.

Figure 3:
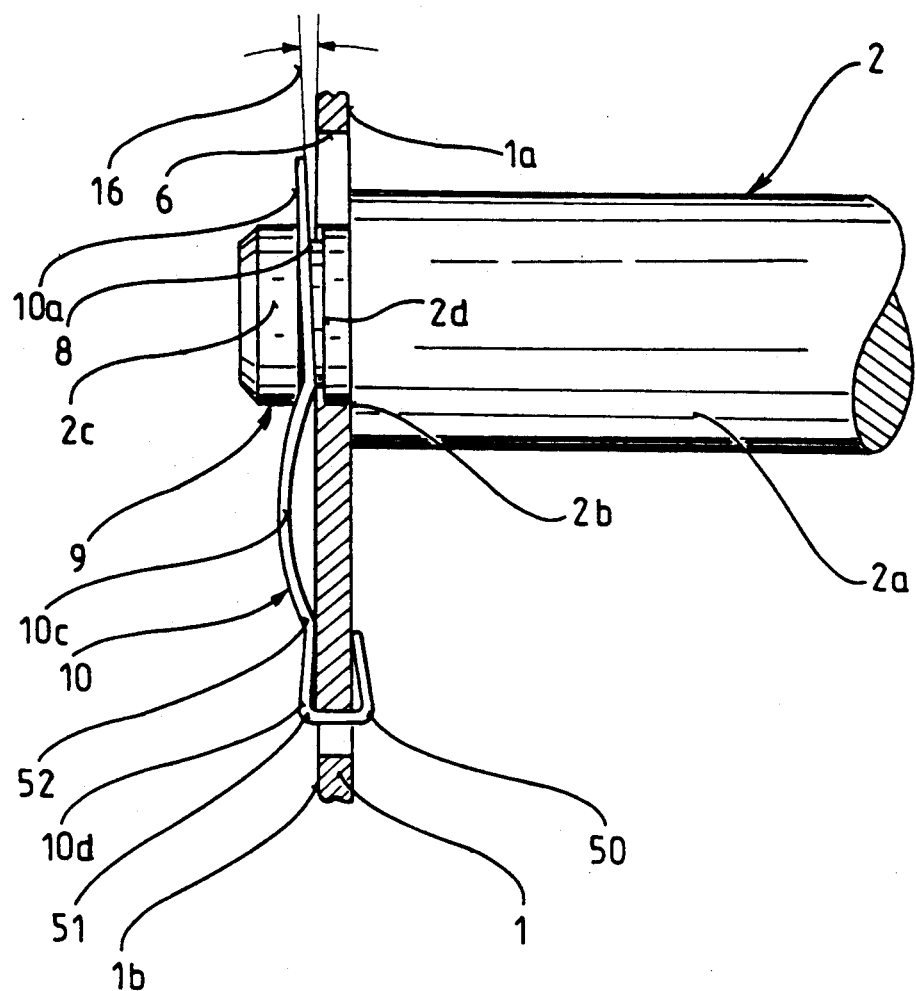
FIG. 3 is a side view of the spring-loaded tensioning element with the side plane component in cross-section.
Figure 4:
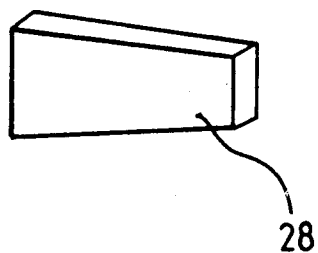
FIG. 4 is a perspective view of a tool means.

The hook-shaped extension 10d with a 180 degree bend, illustrated in FIG. 3, provides a guide for the spring-loaded tensioning element 10. For this purpose, the formed opening 11 is furnished with an opening 17 directed radially to the center point 14 of the smaller circular opening 5 of the side plane component opening 4. The opening 17 exhibits a width 18, which is larger than the width 19 of the hook-shaped extension 10d.

After the positioning of the spring-loaded tensioning element 10 according to FIG. 1, the spring-loaded tensioning element 10 is rotated in the direction of the formed opening 11 and is pulled until the eyelet 10b rests in the insertion groove 2d. Then, the hook-shaped extension 10d reaches a position, where the radius 14a is present. The dimension of the spring-loaded tensioning element 10 agrees with this radius 14a such that, upon a further turning along the rising curve course 13, the tensioning element 10 becomes subject to pull tension and the axle 2 is pressed radially without play into the axial position 3, wherein the axle journal diameter 9 rests against the smaller circular opening 5 of the side plane component 1. In this case, the hook-shaped extension 10d locks and engages the step 12a. Upon a change of the curvature of the center part 10c during the tensioning process, the eyelet part 10a is deformed and rests, by forming a bent angle 16, force-transmittingly at the illustrated collar of the insertion groove 2d and at the side plane component 1 and thus balances longitudinal tolerances. The bent angle 16 can be from about 0.5 to 10 degrees and is preferably from about 1 to 5 degrees. The axle 2 is now axially and radially free of play, supported and locked in the side plane component 1. However, it is still possible to turn the axle 2 in a desired circumferential position by hand.

The locking and unlocking of the spring-loaded tensioning element 10 is performed by a tool means 28 which engages the opening 20.

The diameter of the axle journal 2c can be from about 1.1 to 1.3 times the diameter of the groove 2d. The longitudinal dimension of the bent part can be from about 1 to 1.5 times the longitudinal diameter of the opening 4. The length of the backward bent section of the hook-shaped extension 10d can be from 0.3 to 0.5 times the diameter of the axle journal 2c. The outer width of the hook-shaped extension 10d can be from about 0.4 to 0.6 times the diameter of the axle journal 2c. The angle covered by the length of the line of the curved course 13 plus the length of the locking position step 12a can be from about 15 to 50 degrees and is preferably between 25 and 35 degrees around the center point 14. The opening 17 can have a length which is from about 0.8 to 1.5 and preferably from about 1.0 to 1.2 times the diameter of the axle journal 2c. The opening 17 preferably has straight side borders, which are disposed in a direction parallel to their middle line, where the middle line is running approximately through the center point 14. The distance of the line 13 to the opposite boundary, defining the opening, can be from about 0.5 to 0.7 times the length of the backward directed part of the hook-shaped extension 10d. The opening 4 converges into a circle of smaller diameter for holding the platen axle. The connection direction between the larger and the smaller center point 14 for the platen axle preferably forms an angle of about 40 to 80 degrees with the insertion direction of the spring-loaded tensioning element in the opening 17 and preferably an angle from about 50 to 70 degrees. The angle between the same connection line running through the center point 14 and the center of the larger circle opening 4 can have an angle of from about 20 to 30 degrees with the locking position of the hook-shaped extension 10d. The distance between the centers of the two circles forming the opening 4 can be from about 0.7 to 1.3 times the size of the diameter of the smaller circle and is preferably from about 0.8 to 1.0 times the diameter of the smaller circle. The distance of the two circles forming the opening 15, as measured from center to center, can be 0.4 times the diameter of the smaller circle, which corresponds to the insertion groove diameter 2d and is preferably from about 0.3 to 0.4 times the diameter of the smaller circle of the opening 15 corresponding to the insertion groove 2d. The width of the insertion groove 2d can be from about 0.1 to 0.3 times the diameter of the insertion groove. The thickness of the metal forming the spring-loaded tensioning element can be from about 0.2 to 0.5 times the width of the insertion groove. The spring-loaded tensioning element can be made from spring steel or from spring bronze. The diameter of the platen axle can be from about 1.1 to 1.6 times the diameter of the axle journal 2c and is preferably from about 1.2 to 1.4 times the diameter of the axle journal.

It will be understood that each of the elements described above, or two or more together, may also find a useful application in other types of securing devices differing from the types described above.

While the invention has been illustrated and described as embodied in the context of a support and positioning device for axles of office machines, such as printers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A securing device for axles in office machines such as printers comprising:
   an axle having two ends with an axle journal, a collar and an insertion groove at each end;
   two parallel side plane components each having an opening; each said element of said side plane components being formed of a larger radius circle for inserting said axle journal and a smaller radius circle for retaining said axle journal; a pair of spring tension elements each having an element opening;
   each said element opening of said spring tension elements being formed of a larger radius circle for inserting said axle journal and a smaller radius circle for retaining said axle journal;
   said spring tension elements being disposed in the insertion grooves of said axle journals between said side plane components and said axle journals;
   said spring tension elements each having a hook shaped extension thereon;
   each of said parallel side plane components having a substantially L-shaped slot being formed of two legs, one of said legs of said L-shaped slot being shaped so that said hook shaped extension is permitted to move in a direction substantially perpendicular to an elongation direction of said axle journal for selectively retaining or releasing said axle journal;

the second leg of said substantially L-shaped slot having a curved shape substantially concentric with said axle journal so that when the hook shaped extension is moved to the outer end of said one of said legs and rotated about said axle journal, said hook shaped extension moves along said curved shape to lock said journal in said small radius opening of both said side plane component and said spring tension element.

2. The securing device according to claim 1, wherein the spring-tension element is made of sheet metal and includes a first section having a centrally located, circular opening and furnishing a retaining edge for the respective circular insertion groove;

a bending line defining a bending angle at one end of the first section and disposed in a substantially tangential position relative to the circle of the centrally located, circular opening;

a second section wherein a semicircular opening follows to the element opening such that the bending line is a diameter through the radial center of a larger radius circle opening and where the radius of the larger radius circle opening is sufficient to allow passage of the axle journal and where the larger radius circle opening and a smaller radius circle opening are a joined element opening such that the sheet metal piece slips with the larger radius circle opening over the axle journal and the smaller radius circle opening is placed around the insertion groove;

said second section being bent about cylindrically where the cylinder axis is disposed about parallel to the first bending line defining a bending angle and narrowing in a direction perpendicular to the first bending line to less than half of the maximum width of the first section in a direction parallel to the first bending line;

a third section joining the second section along a second bending line parallel to the first bending line and furnished with a third bending line of the third section disposed parallel to the second bending line; and wherein the hook-shaped extension joins the third section at the third bending line and forms a hook.

3. The securing device according to claim 2, wherein the extension section comprises a fourth section bent relative to the third section at an angle of from about 70 to 100 degrees around the third bending line and the fourth section extending to a fourth bending line running approximately parallel to the third bending line and a fifth section adjoining the fourth section at the fourth bending line at an angle of from about 70 to 100 degrees such that a projection of the fifth section in a direction perpendicular to the third section onto the third section overlaps the third section.

4. The securing device according to claim 3,
wherein the angle between the first section and the second section at the first bending line is from about 150 to 170 degrees;
wherein the angle between the second section and the third section at the second bending line is from about 150 to 170 degrees;
and wherein said angle at the second bending line is on an opposite side of the third section as compared with said angle at the third bending line and wherein said angle at the first bending line is on the same side relative to the second section as said angle at the second bending line.

5. The securing device according to claim 2, further comprising
a tool means to disengage the spring-loaded tensioning element from a side wall of an office machine wherein a slot is disposed in the third section providing a force engagement location for the tool means to disengage the spring-loaded tensioning element from a side wall of an office machine.

6. The securing device according to claim 2, wherein the angle between the first section and the second section at the first bending line is from about 150 to 170 degrees.

7. The securing device according to claim 2, wherein the angle between the second section and the third section at the second bending line is from about 150 to 170 degrees.

8. The securing device according to claim 2, wherein the distance between the first bending line and the second bending line is from about 1 to 1.2 times the maximum dimension of the first section in a direction parallel to the first bending line.

9. The securing device according to claim 2, further comprising
a tool means; wherein
a slot is disposed in a respective spring-loaded tensioning element and directed about parallel to the elongation direction of the spring-loaded tensioning element for effecting a locking and unlocking of the spring-loaded tensioning element by the tool means engaging the slot.

10. The securing device for axles in office machines such as printers according to claim 1,
wherein the spring tension element is tensioned in the insertion groove under spring tension and is disposed perpendicular to the axle journal, and wherein the axle journal is securely positioned in said side plane components against axial shifting by way of the respective spring tension element.

11. The securing device according to claim 1, wherein
a slot is disposed in a respective spring-loaded tensioning element and directed about parallel to the elongation direction of the spring-loaded tensioning element for being engaged by a tool means.

12. The securing device according to claim 1, wherein
a slot is disposed in a respective spring-loaded tensioning element and directed about parallel to the elongation direction of the spring-loaded tensioning element for effecting a locking and unlocking of the spring-loaded tensioning element by a tool means engaging the slot.

13. The securing device according to claim 1, wherein
the axle is formed with the collar resting from inside against the first one of the parallel side plane components, wherein the axle journal, adjoining the insertion groove is inserted into the first one of the elongated openings (4) in the first one of the side plane components, such that an axle journal diameter of the axle journal rests in a small circular opening (5) of the elongated shaped opening (4).

14. Securing device according to claim 13, wherein the spring tension element is formed from an eyelet part and from an arched center part disposed sequentially following to the eyelet part and a hook-shaped extension disposed sequentially following in a longitudinal direction to the arched center part.

15. Securing device according to claim 13, further comprising a curved course rising around a center point of the small circular opening of the opening of the side plane component, wherein
   an inner limitation of the second leg of the L-shaped opening for providing support to the hook-shaped extension of the spring-loaded tensioning element is formed by a curve course rising around the center point of the small circular opening of the side plane component and wherein the hook-shaped extension of the spring tension element rests at the inner limitation and locks at the end of the curve; and
   where the width of the first leg of the L-shaped opening is larger than the width of the hook-shaped extension of the spring tension element.

16. The securing device according to claim 1, wherein
   the spring-loaded tensioning element is formed of an eyelet part and of an arched center part abutting to the eyelet part and wherein the hook-shaped extension abuts in a longitudinal direction to an arched center part of the spring tension element in the locking position.

17. The securing device according to claim 1, wherein the L-shaped opening is disposed in the side plane component substantially opposite of the elongated-shaped opening in a direction corresponding to a line connecting the centers of the larger circle and of the smaller circle, wherein a small recess is formed in the second leg of the L-shaped opening furnishing an inner limitation and
   wherein the hook-shaped extension of the spring tension element rests in locking position at the inner limitation of the curve course of the arc-shaped opening and locks at the end of the rise of the inner curve course in the small recess of the arc-shaped opening.

18. The securing device according to claim 1 wherein the axle journal rests at the collar against the respective side plane component,
   wherein the spring tension element is tensioned in the insertion groove under spring tension and is disposed substantially perpendicular to the axle journal, and wherein the axle journal is securedly positioned in said side plane components against axial shifting by way of the respective spring tension element;
   wherein a small recess is formed in the second leg of the L-shaped opening furnishing an inner edge limitation, wherein a curve course rising around a center point of the smaller circular opening of the elongated side plane component opening forms an inner limitation of the second leg of the L-shaped opening, and wherein the hook-shaped extension of the spring tension element rests at the inner limitation of the curve course of the shaped opening and locks at the end of the rise of the inner curve course in the small recess of the second leg of the L-shaped opening;
   wherein the width of the first leg is larger than the width of the hook-shaped extension of the spring-loaded tension element.

19. The securing device according to claim 1, wherein the element opening for insertion disposed in the spring-tensioning element is directed about parallel to the direction defined by a line between the centers of the larger circle and of the smaller circle and formed to allow insertion and, respectively, removal of the spring tension element from the axle journal and the side wall.

20. A method for securing axles in office machines such as printers, comprising the steps of:
   providing a pair of side plane components in parallel relation, where each side plane component includes a substantially L-shaped slot being formed of two legs and an opening being formed of a larger radius circle and a smaller radius circle;
   inserting a pair of axle journals in each of said side plane components, where each of said axle journals have an insertion groove;
   providing a pair of spring tension elements where each of said spring tension elements having a hook shaped extension, an opening being formed of a larger radius circle for inserting said axle journal and a smaller radius circle for retaining said axle journal;
   inserting one of said pair of spring tension elements between each side plane component and axle journal in said insertion groove;
   moving said hook shaped extensions in a first one of said first legs of said L-shaped slot in a direction substantially perpendicular to said axle journal;
   rotating said hook shaped extension in the second leg of said L-shaped slot, where the second leg of said L-shaped slot has a curved shape substantially concentric with said axle journal;
   locking said hook shaped extension in said second leg of said L-shaped slot to secure the axle journal in the smaller radius circle of both said side plane components and said spring tension elements.

21. The method for securing axles in office machines according to claim 20 further comprising
   disposing an arc-shaped opening in a respective side plane and directed radially to the center point of the small radius circle opening of the side plane component and said radially directed opening having a width, where the width is larger than the width of the hook-shaped extension of the spring tension element.

22. The method for securing axles in office machines according to claim 21 further comprising
   disposing a slot in a respective spring-loaded tensioning element, wherein the slot is directed about parallel to the elongation direction of the spring-loaded tensioning element for allowing insertion and/or removal of the spring-loaded tensioning element from the journal axle and the side wall.

23. The method for securing axles in office machines according to claim 20 further comprising
   forming the spring tension element as an eyelet part with an arched center part following to the eyelet part;
   bending a hook-shaped extension following in a longitudinal direction to an arched center part of the spring-loaded tensioning element.

24. The method for securing axles in office machines according to claim 20 further comprising
   disposing the second leg of the L-shaped opening in the side plane component in a radial direction relative to the smaller radius circle, where an inner limitation of the arc-shaped opening is formed by a curve course rising around the center point of the smaller radius circle opening of the side plane component and wherein the hook-shaped extension of the spring-loaded tensioning element rests at the inner limitation of the curve course of the second leg and locks at the end of the rise of the inner curve course in a small recess of the arc-shaped opening.

* * * * *